United States Patent
Trimmer et al.

(10) Patent No.: US 9,943,921 B2
(45) Date of Patent: Apr. 17, 2018

(54) ELECTROCHEMICAL MACHINING SYSTEM AND METHOD OF MACHINING A CONDUCTIVE WORK PIECE

(71) Applicant: General Electric Company, Schenectady, NY (US)

(72) Inventors: Andrew Lee Trimmer, Niskayuna, NY (US); Steven Robert Hayashi, Nakayuna, NY (US); Edward James Nieters, Burnt Hills, NY (US); Jeremy Gordon McNamara, Albany, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 437 days.

(21) Appl. No.: 14/814,259

(22) Filed: Jul. 30, 2015

(65) Prior Publication Data

US 2017/0028492 A1 Feb. 2, 2017

(51) Int. Cl.
| | |
|---|---|
| *B23H 9/14* | (2006.01) |
| *B23H 9/16* | (2006.01) |
| *B23H 3/04* | (2006.01) |
| *B23H 9/10* | (2006.01) |
| *B23Q 17/22* | (2006.01) |
| *B23H 3/00* | (2006.01) |

(52) U.S. Cl.
CPC ............ *B23H 9/14* (2013.01); *B23H 3/04* (2013.01); *B23H 9/10* (2013.01); *B23H 9/16* (2013.01); *B23Q 17/2233* (2013.01); *B23H 3/00* (2013.01); *Y02E 20/14* (2013.01)

(58) Field of Classification Search
CPC .............. B23H 3/04; B23H 9/14; B23H 9/16
See application file for complete search history.

(56) References Cited

U.S. PATENT DOCUMENTS

| | | | |
|---|---|---|---|
| 3,975,245 A | 8/1976 | Bergquist et al. | |
| 5,306,401 A | 4/1994 | Fierkens et al. | |
| 8,535,491 B2 | 9/2013 | Wei et al. | |
| 8,618,438 B2 | 12/2013 | Graichen | |
| 8,663,450 B1 | 3/2014 | Kathe et al. | |
| 9,403,227 B2 * | 8/2016 | Tamura ................. | B23H 9/14 |

FOREIGN PATENT DOCUMENTS

EP 2752267 A1 7/2014

* cited by examiner

*Primary Examiner* — Nicholas A Smith
(74) *Attorney, Agent, or Firm* — John P. Darling

(57) ABSTRACT

An electrochemical machining system for machining a conductive work piece is provided. The system includes a drilling tool configured to remove material from the conductive work piece. The drilling tool is configured to advance within the conductive work piece along a tool path to form a bore hole having a variable geometry that extends through the conductive work piece when the material is removed therefrom. The system further includes an inspection device configured to determine a position of the drilling tool along the tool path, and a controller configured to communicate with the inspection device. The controller is further configured to compare the tool path to a nominal tool path, and determine a position error of said drilling tool, the position error defined by a difference between the tool path and the nominal tool path.

20 Claims, 6 Drawing Sheets

ELECTROCHEMICAL MACHINING SYSTEM AND METHOD OF MACHINING A CONDUCTIVE WORK PIECE

BACKGROUND

The present disclosure relates generally to electrochemical machining (ECM) and, more specifically, to systems and methods of forming a continuous, variable geometry bore hole within a conductive work piece.

Rotary machines, such as gas turbines, are often used to generate power with electric generators. Gas turbines, for example, have a gas path that typically includes, in serial-flow relationship, an air intake, a compressor, a combustor, a turbine, and a gas outlet. Compressor and turbine sections include at least one row of circumferentially-spaced rotating buckets or blades coupled within a housing. At least some known turbine engines are used in cogeneration facilities and power plants. Engines used in such applications may have high specific work and power per unit mass flow requirements. Moreover, the efficiency of gas turbines is directly proportional to the temperature of exhaust gas discharged from the combustor and channeled past the rotating buckets or blades of the turbine. As such, the extreme temperatures of the exhaust gas generally require the static and rotating turbine airfoils to be manufactured from high temperature-resistant materials, and to include cooling features therein.

For example, turbine blades are typically cooled by channeling compressor discharge air through a plurality of cooling channels extending through the turbine blades. At least one known process of forming the cooling channels in the turbine blades is shaped-tube electrochemical machining (STEM). STEM is a non-contact electrochemical machining process that utilizes a conductive work piece (i.e., the turbine blades) as an anode, and an elongated drilling tube as a cathode. As the conductive work piece is flooded with an electrolytic solution, material is oxidized and removed from the conductive work piece near the leading edge of the drilling tube. STEM is generally effective at forming straight cooling channels having high aspect ratios within turbine blades. However, the fixed orientation of an electrode tip positioned at the leading edge of the drilling tube and the rigidity of the elongated drilling tube generally limits the geometry in which the cooling channels can be formed within the turbine blades.

BRIEF DESCRIPTION

In one aspect, an electrochemical machining system for machining a conductive work piece is provided. The system includes a drilling tool configured to remove material from the conductive work piece. The drilling tool is configured to advance within the conductive work piece along a tool path to form a bore hole having a variable geometry that extends through the conductive work piece when the material is removed therefrom. The system further includes an inspection device configured to determine a position of the drilling tool along the tool path, and a controller configured to communicate with the inspection device. The controller is further configured to compare the tool path to a nominal tool path, and determine a position error of said drilling tool, the position error defined by a difference between the tool path and the nominal tool path.

In another aspect, a method of machining a conductive work piece is provided. The method includes advancing a drilling tool within the conductive work piece along a tool path to form a bore hole having a variable geometry that extends through the conductive work piece when the material is removed therefrom. The drilling tool including a plurality of electrode patches. The method also includes conducting an inspection of the conductive work piece to determine a position of the drilling tool along the tool path, and determining a position error of the drilling tool, the position error defined by a difference between the position of the drilling tool when compared to a theoretical position of the drilling tool along a nominal tool path.

In yet another aspect, one or more non-transitory computer-readable storage media having computer-executable instructions embodied thereon for use in machining a conductive work piece is provided. When executed by a controller, the computer-executable instructions cause the controller to direct a robotic device to advance a drilling tool within the conductive work piece along a tool path to form a bore hole having a variable geometry that extends through the conductive work piece when the material is removed therefrom. The drilling tool includes a plurality of electrode patches. The computer-executable instructions further cause the controller to direct a robotic device to direct an inspection device to conduct an inspection of the conductive work piece to determine a position of the drilling tool along the tool path, and to determine a position error of the drilling tool, the position error defined by a difference between the position of the drilling tool when compared to a theoretical position of the drilling tool along a nominal tool path.

DRAWINGS

These and other features, aspects, and advantages of the present disclosure will become better understood when the following detailed description is read with reference to the accompanying drawings in which like characters represent like parts throughout the drawings, wherein.

Figure 1:
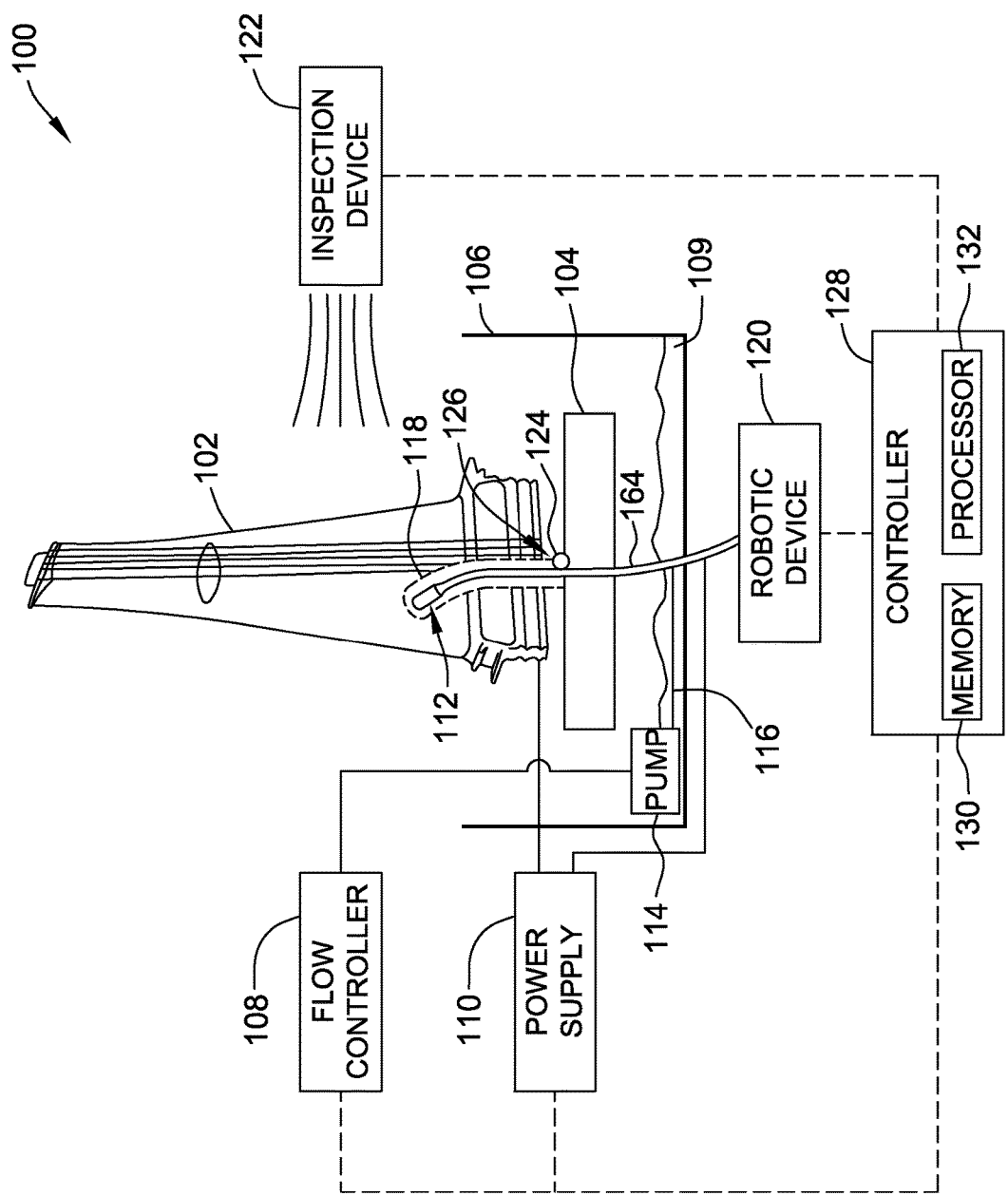
FIG. 1 is a schematic illustration of an exemplary electrochemical machining system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Embodiments of the present disclosure relate to an electrochemical machining (ECM) system and methods of machining a conductive work piece, such as a turbine blade, bucket, or vane. More specifically, the ECM system includes a drilling tool having a body portion and multiple electrode patches coupled to the body portion in different orientations. Coupling the electrode patches to the body portion in different orientations enables the drilling tool to form a continuous, variable-geometry bore hole within the conductive work piece. As used herein, "variable-geometry" refers to dimensional changes in more than one plane. The drilling tool may also include a flexible guide member coupled to the body portion, which facilitates guiding the drilling tool through the continuous, variable-geometry bore hole. Moreover, ECM system may include an inspection device for providing real-time feedback on the position of the drilling tool advancing through the conductive work piece, and on an orientation of the bore hole extending therethrough. As such, in one embodiment, the real-time feedback is utilized to determine a position error of the drilling tool when compared to a nominal tool path, and is utilized to facilitate proper execution of the tool path. For example, the real-time feedback is provided as a function of the rate of material removal from the conductive work piece such that corrective actions can be implemented in a timely manner.

FIG. 1 is a schematic illustration of an exemplary electrochemical machining (ECM) system 100 for machining a conductive work piece 102. In the exemplary embodiment, conductive work piece 102 is coupled to a mounting platform 104 positioned within an electrolyte container 106. As will be described in more detail below, a flow controller 108 facilitates discharging a flow of electrolytic fluid 109 from within electrolyte container 106 towards conductive work piece 102 during machining operations. In the exemplary embodiment, mounting platform 104 is positioned such that conductive work piece 102 is located above electrolytic fluid 109. Alternatively, mounting platform 104 is positioned such that conductive work piece 102 is at least partially submerged within electrolytic fluid 109, or electrolytic fluid 109 is supplied from a source remote from conductive work piece 102.

ECM system 100 includes a power supply 110 and a drilling tool 112 electrically coupled to power supply 110. More specifically, power supply 110 is electrically coupled to conductive work piece 102, which acts as an anode in the machining process, and to drilling tool 112, which acts as a cathode in the machining process. Material is removed from conductive work piece 102 when power supply 110 supplies electric current to drilling tool 112 forming an applied potential across conductive work piece 102 and drilling tool 112. Material removed from conductive work piece 102 by drilling tool 112 is flushed away by the flow of electrolytic fluid 109 discharged towards conductive work piece 102. More specifically, flow controller 108 is coupled to a pump 114, which facilitates supplying electrolytic fluid 109 to drilling tool 112 via a fluid supply line 116. As such, as will be described in more detail below, drilling tool 112 advances within conductive work piece 102 in more than one dimension along a tool path to form a bore hole 118 having a variable geometry that extends through conductive work piece 102 when the material is removed therefrom. More specifically, drilling tool 112 is capable of advancing within conductive work piece 102 in more than one dimension (i.e., in a non-linear direction).

ECM system 100 also includes a robotic device 120, or any suitable articulating member, coupled to drilling tool 112 that facilitates advancing drilling tool 112 along the tool path within conductive work piece 102. In the exemplary embodiment, robotic device 120 is any suitable computer numerically controlled device, such as a robotic end effector, that enables drilling tool 112 to be advanced along the tool path in a controlled and automated manner. More specifically, as will be explained in more detail below, robotic device 120 facilitates modifying an orientation of drilling tool 112 within bore hole 118, such that bore hole 118 formed within conductive work piece 102 has a variable geometry. Alternatively, the orientation of drilling tool 112 within bore hole 118 is modified without the use of robotic device 120, such as manually by an operator.

ECM system 100 may also include an inspection device 122 for performing non-destructive inspections of conductive work piece 102. Inspection device 122 is any non-destructive inspection device that enables ECM system 100 to function as described herein. Exemplary non-destructive inspection devices include, but are not limited to, an ultrasonic testing device, an X-ray testing device, and a computed tomography (CT) scanning device. As will be described in more detail below, inspection device 122 operates, either continuously or at predetermined intervals, to determine at least one of the orientation of bore hole 118 formed by drilling tool 112, or a position of drilling tool 112 along the tool path. As such, a position error of drilling tool 112 can be determined when the actual tool path is different from a nominal tool path of drilling tool 112.

In some embodiments, ECM system 100 includes an ion sensor 124 positioned proximate an outlet 126 of bore hole 118. As described above, material removed from conductive work piece 102 by drilling tool 112 is flushed away by the flow of electrolytic fluid 109 discharged towards conductive work piece 102. Ion sensor 124 measures an ion concentration in electrolytic fluid 109 discharged from outlet 126 of bore hole 118. As will be described in more detail below, the ion concentration measurement is used to determine a chemical composition of electrolytic fluid 109, which facilitates determining the health or operational status of drilling tool 112. Alternatively, a learning algorithm embodied within a memory of a controller 128 is used to determine the health or operational status of drilling tool 112.

In the exemplary embodiment, flow controller 108, power supply 110, robotic device 120, inspection device 122, and ion sensor 124 are coupled in communication, either wired or wirelessly, with controller 128. Controller 128 includes a memory 130 (i.e., a non-transitory computer-readable medium) and a processor 132 coupled to memory 130 for executing programmed instructions. Processor 132 may include one or more processing units (e.g., in a multi-core configuration) and/or include a cryptographic accelerator (not shown). Controller 128 is programmable to perform one or more operations described herein by programming memory 130 and/or processor 132. For example, processor 132 may be programmed by encoding an operation as executable instructions and providing the executable instructions in memory 130.

Processor 132 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 132, cause processor 132 to perform at least a portion of the functions described herein. The above examples are exemplary only, and thus are not intended to limit in any way the definition and/or meaning of the term processor.

Memory 130 is one or more devices that enable information such as executable instructions and/or other data to be stored and retrieved. Memory 130 may include one or more computer-readable media, such as, without limitation, dynamic random access memory (DRAM), synchronous dynamic random access memory (SDRAM), static random access memory (SRAM), a solid state disk, and/or a hard disk. Memory 130 may be configured to store, without limitation, executable instructions, operating systems, applications, resources, installation scripts and/or any other type of data suitable for use with the methods and systems described herein.

Instructions for operating systems and applications are located in a functional form on non-transitory memory 130 for execution by processor 132 to perform one or more of the processes described herein. These instructions in the different implementations may be embodied on different physical or tangible computer-readable media, such as memory 130 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 128 to permit access and/or execution by processor 132. In an alternative implementation, the computer-readable media is not removable.

Figure 2:
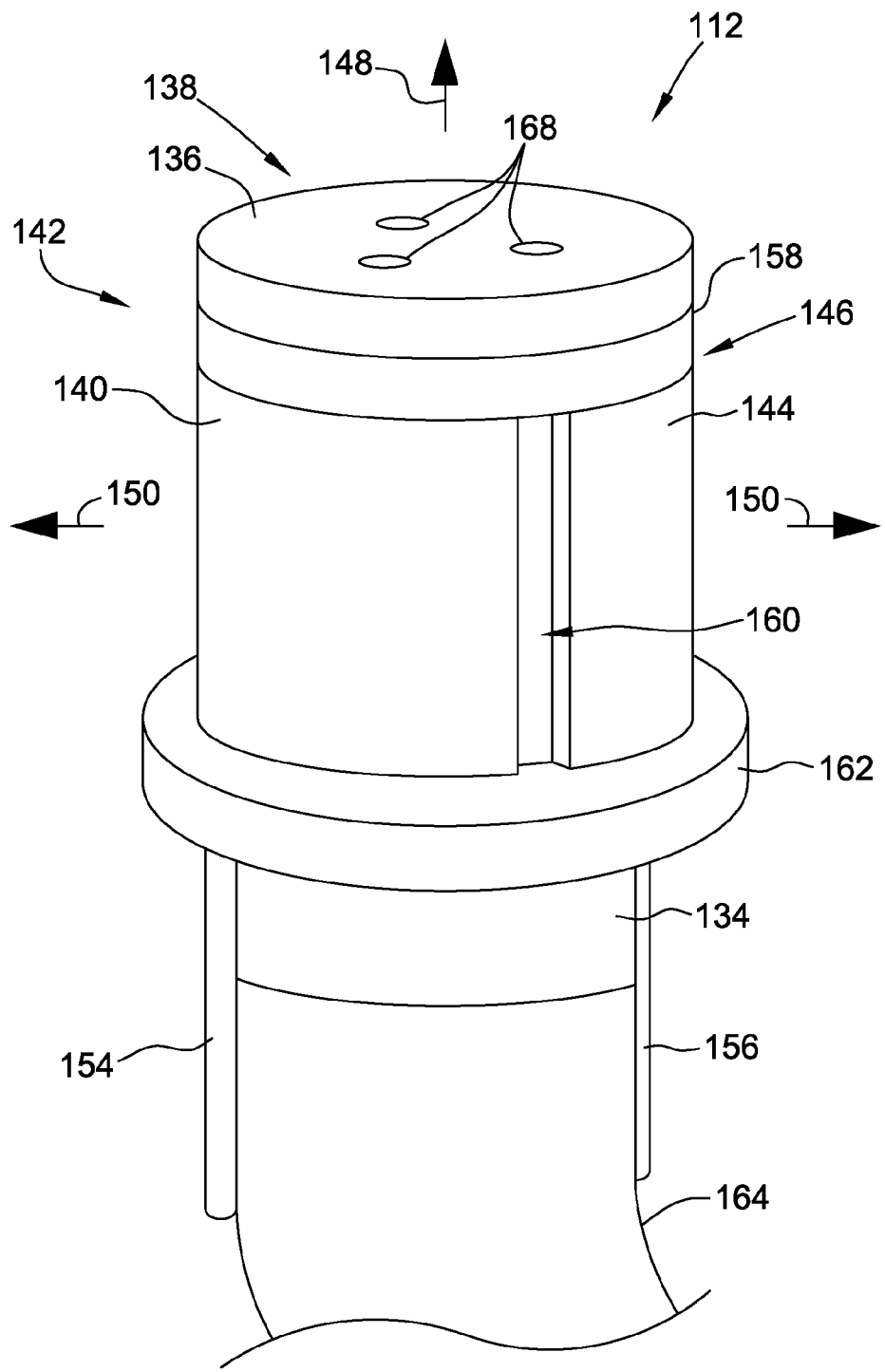
FIG. 2 is a perspective view of an exemplary drilling tool that may be used with the electrochemical machining system shown in FIG. 1.
Figure 3:
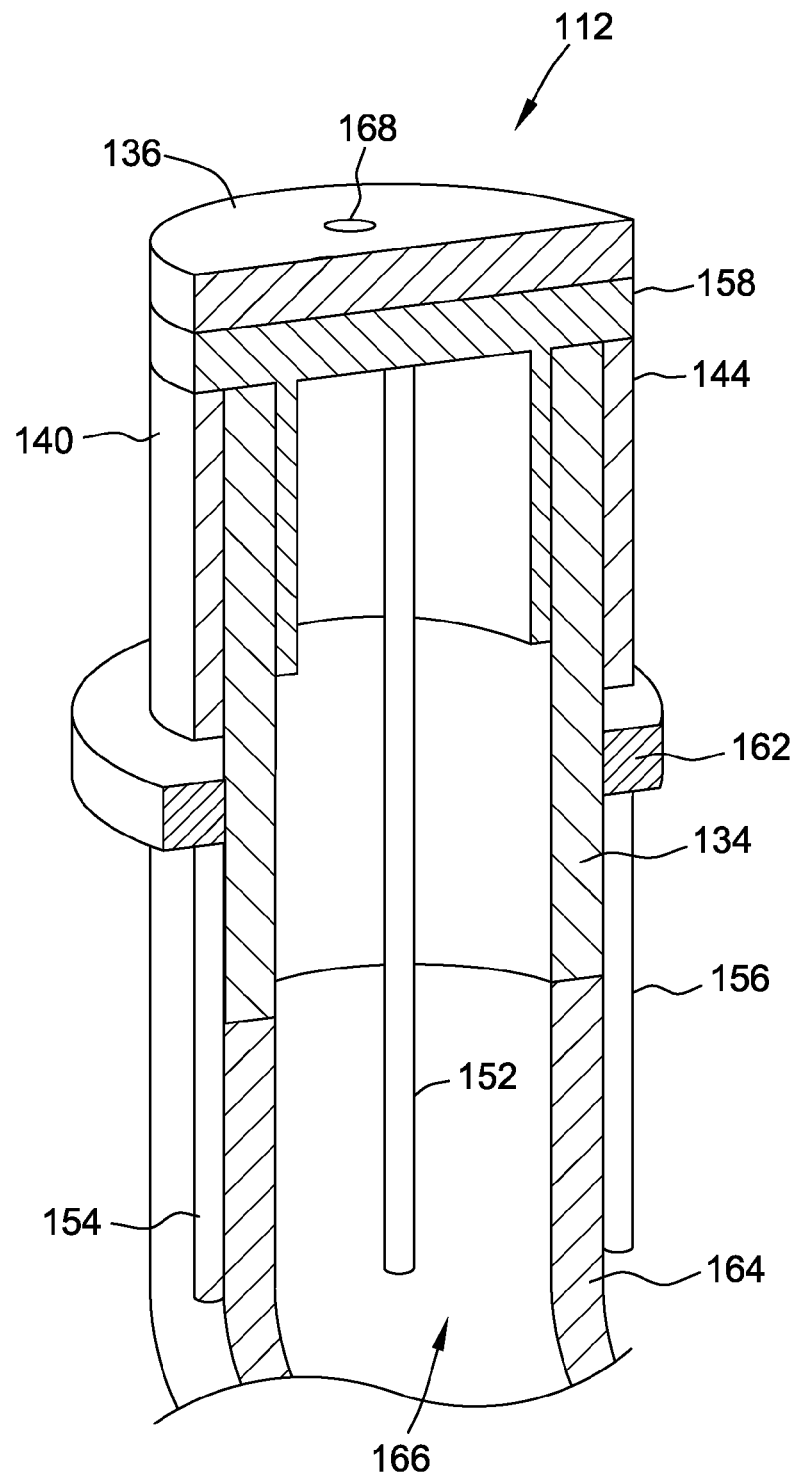
FIG. 3 is a cross-sectional illustration of the drilling tool shown in FIG. 2.

FIG. 2 is a perspective view of drilling tool 112 that may be used with ECM system 100 (shown in FIG. 1), and FIG. 3 is a cross-sectional illustration of drilling tool 112. In the exemplary embodiment, drilling tool 112 includes a body portion 134 and a plurality of electrode patches coupled thereto. More specifically, a forward electrode 136 is coupled on a tip 138 of body portion 134, and at least one side electrode is coupled to body portion 134. For example, a first side electrode 140 is coupled on a first side 142 of body portion 134, and a second side electrode 144 is coupled on a second side 146 of body portion 134. Forward electrode 136 is oriented on body portion 134 such that material oriented in a first direction 148 from body portion 134 is removed from conductive work piece 102 (shown in FIG. 1) when electric current is supplied to forward electrode 136. Removing material oriented in first direction 148 from body portion 134 enables drilling tool 112 to travel in a forward direction along the tool path. Moreover, the at least one side electrode is oriented on body portion 134 such that material oriented in a second direction 150 from body portion 134 is removed from conductive work piece 102 when electric current is supplied to the at least one side electrode. Removing material oriented in second direction 150 from body portion 134 enables the tool path of drilling tool 112 to be directionally modified. As such, bore hole 118 (shown in FIG. 1) formed by drilling tool 112 that advances within conductive work piece 102 has a variable geometry. Further, while shown as including first and second side electrodes 140 and 144, it should be understood that any number of side electrodes may be used that enables drilling tool 112 to function as described herein. Moreover, the plurality of electrodes may each be coupled to an independent power supply, such that material can be removed from each electrode at different rates. In one embodiment, power supply 110 has a plurality of channels that can be used to independently supply the forward electrode and at the at least one side electrode. Power supply 110 is capable of supplying a steady current, or may be pulsed in an on-then-off, or high-current-then-low-current-manner.

Drilling tool 112 also includes a plurality of bussing wires for electrically coupling the electrode patches to power supply 110 (shown in FIG. 1). More specifically, a first bussing wire 152 electrically couples forward electrode 136 to power supply 110, a second bussing wire 154 electrically couples first side electrode 140 to power supply 110, and a third bussing wire 156 electrically couples second side electrode 144 to power supply 110. As such, as will be described in more detail below, forward electrode 136 and first and second side electrodes 140 and 144 are selectively, and independently, operable to form bore hole 118 having a variable geometry that extends through conductive work piece 102 when material is removed therefrom.

In the exemplary embodiment, drilling tool 112 includes a spacer 158 positioned between forward electrode 136 and first and second side electrodes 140 and 144. Spacer 158 facilitates electrically isolating forward electrode 136 from first and second side electrodes 140 and 144. Moreover, a gap 160 is defined between adjacent side electrodes when more than one side electrode is coupled to body portion 134. As such, the electrode patches are electrically isolated from each other to facilitate limiting formation of electrical shorts.

Drilling tool 112 also includes a non-conductive bumper 162 coupled to body portion 134. Non-conductive bumper 162 may be fabricated from any material that enables drilling tool 112 to function as described herein. For example, in one embodiment, non-conductive bumper 162 is fabricated from a non-conductive polymer material. Non-conductive bumper 162 extends a greater distance from body portion 134 than first and second side electrodes 140 and 144. As such, non-conductive bumper 162 spaces first and second side electrodes 140 and 144 from side walls of bore hole 118 to facilitate limiting formation of electrical shorts between first and second side electrodes 140 and 144 and conductive work piece 102.

Moreover, drilling tool 112 includes a flexible guide member 164 coupled to body portion 134. Flexible guide member 164 facilitates guiding drilling tool 112 through bore hole 118 extending through conductive work piece 102. As described above, the electrode patches of drilling tool 112 are selectively operable such that bore hole 118 having a variable geometry extends through conductive work piece 102. As such, fabricating flexible guide member 164 from a flexible material enables drilling tool 112 to maneuver along a variable geometry tool path within conductive work piece 102. Exemplary flexible materials include, but are not limited to rubber, silicone, nylon, polyurethane, and latex. Moreover, in some embodiments, the flexible material is coated with a layer of copper to form an electrical conduit along guide member 164.

Referring to FIG. 3, a central flushing channel 166 extends through flexible guide member 164 and body portion 134. Central flushing channel 166 is sized to channel a flow of electrolytic fluid 109 (shown in FIG. 1) therethrough for flushing material removed from conductive work piece 102 from bore hole 118. More specifically, forward electrode 136 includes at least one flushing aperture 168 defined therein. Flushing aperture 168 couples central flushing channel 166 in flow communication with conductive work piece 102. As such, electrolytic fluid 109 channeled through central flushing channel 166 is discharged from flushing aperture 168 to flush material removed from conductive work piece 102.

In operation, controller 128 directs inspection device 122 to conduct a pre-drilling inspection of conductive work piece 102. The pre-drilling inspection facilitates determining dimensions of conductive work piece 102 for comparison against dimensions of a virtual conductive work piece (i.e., a CAD drawing of a nominal conductive work piece 102). In the exemplary embodiment, the virtual conductive work piece includes a plurality of nominal tool paths that correspond to tool paths for forming bore holes 118 in conductive work piece 102 with drilling tool 112. Inherent dimensional variations between conductive work piece 102 and the virtual conductive work piece causes the nominal tool paths to be modified before being executed by drilling tool 112 to ensure bore holes 118 formed in conductive work piece 102 are maintained within dimensional tolerances. As such, controller 128 determines variations in dimensions of conductive work piece 102 when compared to dimensions of the virtual conductive work piece, and modifies the nominal tool paths based on the variations in conductive work piece 102. The modified nominal tool paths are then executed by drilling tool 112.

More specifically, in one embodiment, controller 128 directs robotic device 120 to advance drilling tool 112 within conductive work piece 102 along an actual tool path to form bore hole 118. Controller 128 then directs inspection device 122 to conduct an inspection of conductive work piece 102 to determine a position of drilling tool 112 along the tool path, compares the tool path to the corresponding modified nominal tool path, and determines a position error of drilling tool 112. The position error is defined by a difference between the position of drilling tool 112 when compared to a theoretical position of drilling tool 112 along the corresponding modified nominal tool path. Alternatively, controller 128 directs robotic device 120 to advance drilling tool 112 along an arbitrary tool path. Moreover, alternatively, drilling tool 112 is advanced along a tool path manually.

In some embodiments, controller 128 executes a corrective action to reduce the position error by modifying at least one drilling parameter when the position error is greater than a first predetermined threshold. Exemplary drilling parameters include an amount of electric current supplied to the plurality of electrode patches, an orientation of drilling tool 112 within bore hole 118, a flushing pressure of the electrolytic fluid channeled through central flushing channel 166 of drilling tool 112, and a feed rate of drilling tool 112 advancing within bore hole 118. As such, controller 128 executes corrective actions by modifying at least one of the drilling parameters for drilling tool 112 when the position error is greater than the first predetermined threshold.

In one embodiment, controller 128 selects which drilling parameter to modify, or modifies a drilling parameter by a certain degree, based on an amount that the position error is greater than the first predetermined threshold. For example, controller 128 executes a low-level corrective action when the position error is greater than the first predetermined threshold, and less than a second predetermined threshold greater than the first predetermined threshold. One exemplary low-level corrective action includes directing power supply 110 to supply varying amounts of electric current to the electrode patches such that material oriented in first and second directions 148 and 150 from conductive work piece 102 is removed at different rates. An alternative low-level corrective action includes directing power supply 110 to supply a first electric current to forward electrode 136 at a first time, and directing power supply 110 to supply a second electric current to the at least one side electrode at a second time that does not overlap with the first time. In an alternative embodiment, controller 128 directs power supply 110 to supply electric current to the electrode patches such that vaults or turbulations (i.e., a square-shaped waveform) are formed within bore hole 118.

Moreover, for example, controller 128 executes a mid-level corrective action when the position error is greater than the first predetermined threshold, and less than a third predetermined threshold greater than the second predetermined threshold. One exemplary mid-level corrective action includes directing power supply 110 to stop supplying electric current to one or more of the electrode patches. An alternative mid-level corrective action includes directing robotic device 120 to modify the orientation of drilling tool 112 within bore hole 118. As such, executing mid-level corrective actions facilitates correcting position errors of drilling tool 112 at a greater rate when compared to low-level corrective actions.

Any combination of low-level and mid-level corrective actions may be implemented in a coordinated manner to facilitate advancing drilling tool 112 along a tool path.

In some embodiments, controller 128 terminates operation of drilling tool 112 when the position error is greater than a fourth predetermined threshold, which is greater than the third predetermined threshold. In such an embodiment, low-level and mid-level corrective actions were unable to return the position error within acceptable tolerances, such that terminating operation of drilling tool 112 ensures further deviations from a modified nominal tool path are ceased.

Moreover, in some embodiments, controller 128 receives ion concentration measurements of electrolytic fluid discharged from bore hole 118 measured by ion sensor 124. Controller 128 then determines a chemical composition of the electrolytic fluid based on the ion concentration in the electrolytic fluid. As described above, determining the chemical composition of the electrolytic fluid facilitates determining the health or operational status of drilling tool 112. For example, controller 128 determines if a concentration of ions from the electrode patch material measured in the electrolytic fluid is greater than a threshold. If so, an electrical short may have occurred and controller 128 terminates operation of drilling tool 112

Figure 4:
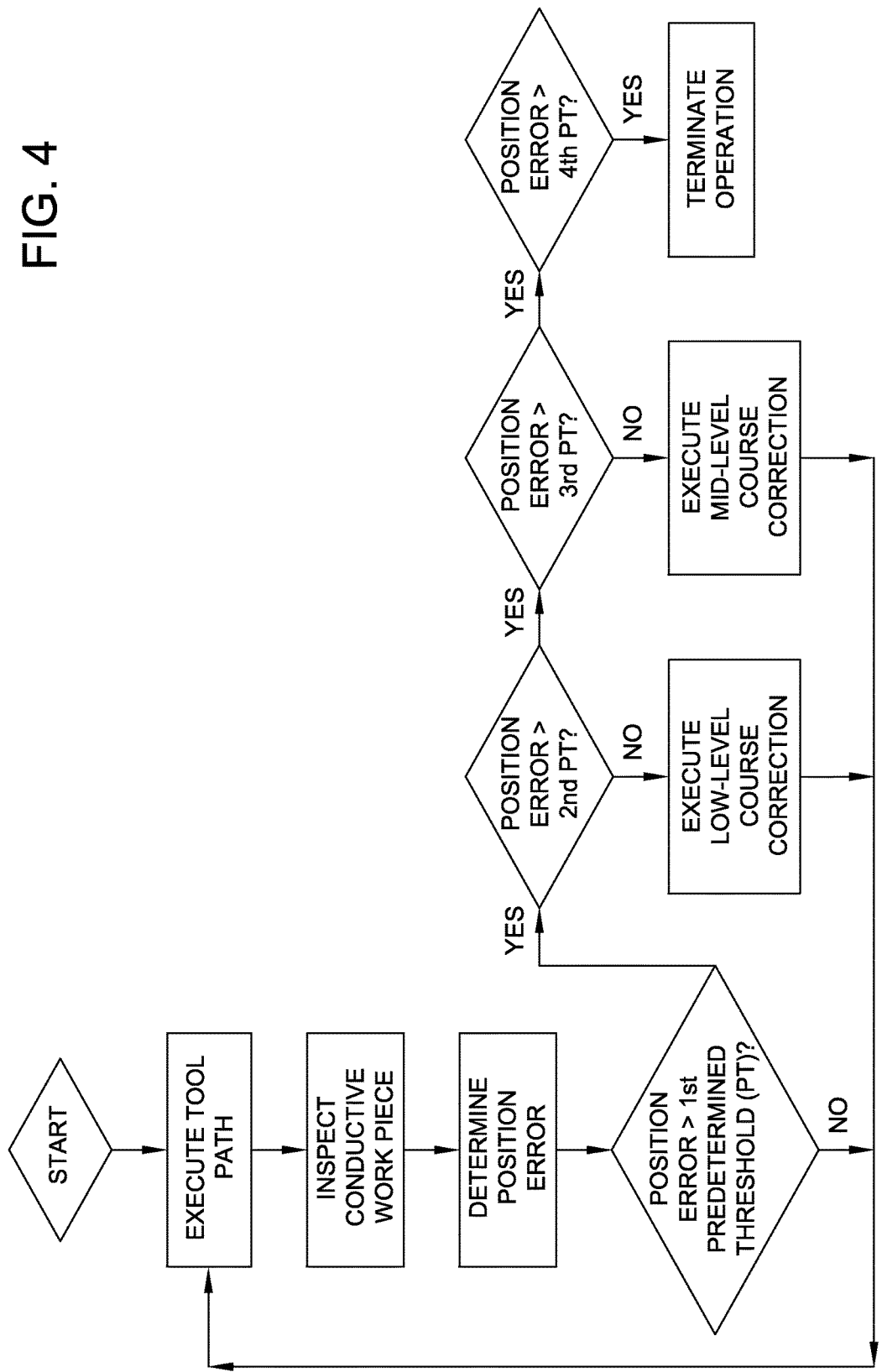
FIG. 4 is a logic diagram of an exemplary method of machining a conductive work piece that may be used with the electrochemical machining system shown in FIG. 1.

FIG. 4 is a logic diagram of an exemplary method of machining conductive work piece 102 (shown in FIG. 1). As described above, conductive work piece 102 is inspected either continuously or at predetermined intervals to determine a position error of drilling tool 112 (shown in FIG. 1). Controller 128 (shown in FIG. 1) then executes one or more corrective actions to ensure the tool path is executed properly. As shown in FIG. 4, the process of executing the tool path, inspecting conductive work piece 102, determining the position error, and executing corrective actions is embodied as a continuous cycle. As such, in one embodiment, drilling tool 112 is advanced along the tool path until it has been fully executed.

Figure 5:
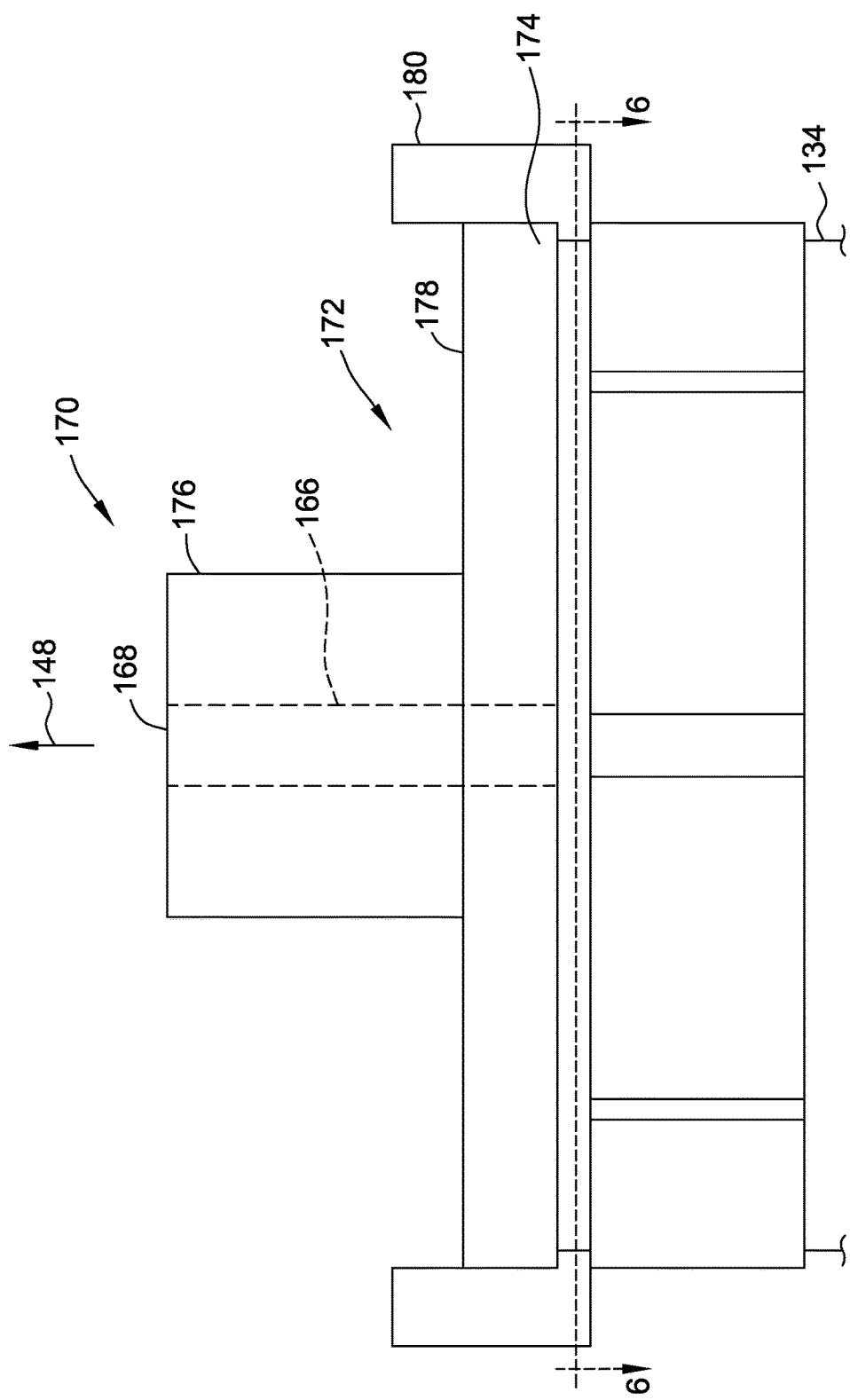
FIG. 5 is a perspective view of an alternative drilling tool that may be used with the electrochemical machining system shown in FIG. 1.

FIG. 5 is a perspective view of an alternative drilling tool 170 that may be used with electrochemical machining system 100 (shown in FIG. 1). In the exemplary embodiment, drilling tool 170 includes body portion 134 and a plurality of electrode patches coupled thereto. More specifically, a forward electrode 172 is coupled body portion 134, and at least one side electrode is coupled to body portion 134. Forward electrode 172 has a "top hat" configuration having an outer radial portion 174 coupled to body portion 134 and an inner radial portion 176 extending from a forward face 178 of outer radial portion 174. Moreover, flushing channel 166 extends through outer and inner radial portions 174 and 176 to facilitate directing fluid towards conductive work piece 102.

Drilling tool 170 also includes a non-conductive bumper 180 positioned radially outward from outer radial portion 174 of forward electrode 172. Non-conductive bumper 180 extends circumferentially about outer radial portion 174, and at least a portion of non-conductive bumper 180 extends in first forward direction 148 beyond forward face 178 of outer radial portion 174. As such, when electric current is supplied to forward electrode 172, an electric field generated therefrom is forced to travel around non-conductive bumper 180 prior to contacting the side walls of bore hole 118 (shown in FIG. 1), which facilitates balancing the removal rate of material from conductive work piece 102 positioned closest to outermost portions of outer radial portion 174.

Moreover, extending inner radial portion 176 in direction 148 from forward face 178 extends the field of influence of the electric field generated by forward electrode 172 in the forward direction when compared to a flat electrode having a similar amount of electric current supplied thereto. Extending the field of influence of the electric field generated by forward electrode 172 facilitates increasing material removal from conductive work piece 102 without having to increase an amount of electric current supplied to forward electrode 172. In addition, having an outermost portion of inner radial portion 176 positioned radially inward from outer radial portion 174 facilitates reducing contact between forward electrode 172 and conductive work piece 102 when bore hole 118 curves within conductive work piece 102.

Figure 6:
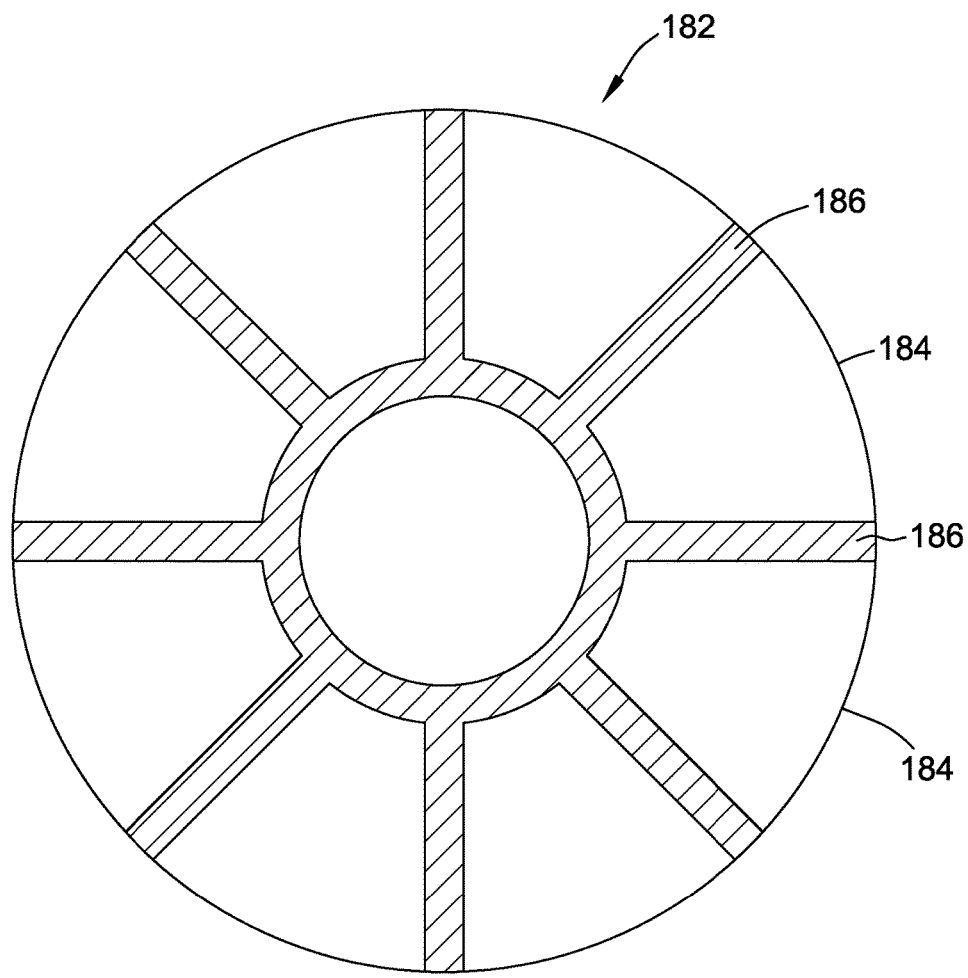
FIG. 6 is an illustration of a portion of the drilling tool shown in FIG. 5 taken along Line 6-6.

FIG. 6 is an illustration of a portion of drilling tool 170 (shown in FIG. 5) taken along Line 6-6. In the exemplary implementation, drilling tool 170 includes a side electrode assembly 182 coupled to body portion 134 (shown in FIG. 5). Side electrode assembly 182 includes a plurality of side electrodes 184 spaced from each other and positioned circumferentially about side electrode assembly 182. More specifically, side electrode assembly 182 also includes a non-conductive spacing member 186 extending between adjacent side electrodes 184, which facilitates electrically isolating side electrodes 184 from each other. Moreover, similar to side electrodes 140 and 144, side electrodes 184 are independently and selectively operable with each other such that bore hole 118 formed in conductive work piece 102 (each shown in FIG. 1) has a variable geometry.

The systems and methods described herein relate to forming continuous and variable-geometry bore holes within a conductive work piece. The system includes a drilling tool having multiple electrode patches capable of removing material from the conductive work piece in more than one dimension. The system also includes an inspection device that provides real-time feedback on the position of the drilling tool within the conductive work piece. The inspection device is coupled to a controller, which processes the real-time feedback and, in one embodiment, causes drilling tool to execute corrective action. As such, the system and methods described herein facilitate forming the continuous and variable-geometry bore holes within the conductive work piece in an autonomous, accurate, and time-efficient manner.

An exemplary technical effect of the electrochemical machining system and methods described herein includes at least one of: (a) providing a drilling tool capable of forming variable-geometry bore holes within a conductive work piece; (b) providing real-time positional data of the drilling tool within the conductive work piece; and (c) using the real-time positional data to facilitate corrective action for the drilling tool.

Exemplary embodiments of the electrochemical machining system are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only gas turbine engine components and related methods as described herein. Rather, the exemplary embodiment can be implemented and utilized in connection with many applications where forming bore holes within a conductive work piece is desirable.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrochemical machining system for machining a conductive work piece, said system comprising:
a drilling tool configured to remove material from the conductive work piece, wherein said drilling tool is configured to advance within the conductive work piece along a tool path to form a bore hole having a variable geometry that extends through the conductive work piece when the material is removed therefrom;
an inspection device configured to determine a position of said drilling tool along the tool path; and
a controller configured to communicate with said inspection device, wherein said controller is further configured to:
compare the tool path to a nominal tool path; and
determine a position error of said drilling tool, the position error defined by a difference between the tool path and the nominal tool path.

2. The system in accordance with claim 1, wherein said inspection device is configured to perform a pre-drilling inspection of the conductive work piece to determine dimensions thereof, said controller further configured to determine a modified nominal tool path based on variations in the dimensions of the conductive work piece when compared to dimensions of a virtual conductive work piece.

3. The system in accordance with claim 1, wherein said inspection device comprises at least one of an ultrasonic testing device or an X-ray testing device.

4. The system in accordance with claim 1 further comprising a flow controller configured to channel a flow of electrolytic fluid through a central flushing channel extending through said drilling tool, such that the flow of electrolytic fluid is discharged towards the conductive work piece in the bore hole.

5. The system in accordance with claim 4 further comprising an ion sensor configured to measure an ion concentration in the electrolytic fluid discharged from the bore hole.

6. The system in accordance with claim 1 further comprising a robotic device coupled to said drilling tool, wherein said robotic device is configured to advance said drilling tool along the tool path.

7. The system in accordance with claim 6, wherein said robotic device is configured to communicate with said controller, said robotic device further configured to modify an orientation of said drilling tool within the bore hole based on the position error of said drilling tool.

8. A method of machining a conductive work piece, said method comprising:
advancing a drilling tool within the conductive work piece along a tool path to form a bore hole having a variable geometry that extends through the conductive work piece when the material is removed therefrom, the drilling tool including a plurality of electrode patches;
conducting an inspection of the conductive work piece to determine a position of the drilling tool along the tool path; and
determining a position error of the drilling tool, the position error defined by a difference between the position of the drilling tool when compared to a theoretical position of the drilling tool along a nominal tool path.

9. The method in accordance with claim 8 further comprising:
conducting a pre-drilling inspection of the conductive work piece;
determining variations in dimensions of the conductive work piece when compared to dimensions of a virtual conductive work piece; and
modifying the nominal tool path based on the variations in the conductive work piece.

10. The method in accordance with claim 8 further comprising executing a corrective action to reduce the position error when the position error is greater than a first predetermined threshold.

11. The method in accordance with claim 10, wherein executing a corrective action comprises modifying at least one drilling parameter that comprises at least one of an amount of electric current supplied to the plurality of electrode patches, an orientation of the drilling tool within the bore hole, a flushing pressure of electrolytic fluid channeled through the drilling tool, or a feed rate of the drilling tool advancing within the bore hole.

12. The method in accordance with claim 10 further comprising executing a low-level corrective action when the position error is greater than the first predetermined threshold, and less than a second predetermined threshold greater than the first predetermined threshold.

13. The method in accordance with claim 12 further comprising executing a mid-level corrective action when the position error is greater than the second predetermined threshold, and less than a third predetermined threshold greater than the second predetermined threshold.

14. The method in accordance with claim 13 further comprising terminating operation of the drilling tool when the position error is greater than a fourth predetermined threshold greater than the third predetermined threshold.

15. The method in accordance with claim 8 further comprising:
   discharging a flow of electrolytic fluid towards the conductive work piece within the bore hole, the flow of electrolytic fluid channeled through a central flushing channel extending through the drilling tool;
   measuring an ion concentration in the electrolytic fluid discharged from the bore hole; and
   determining a chemical composition of the electrolytic fluid based on the ion concentration in the electrolytic fluid.

16. One or more non-transitory computer-readable storage media having computer-executable instructions embodied thereon for use in machining a conductive work piece, wherein when executed by a controller, the computer-executable instructions cause the controller to:
   direct a robotic device to advance a drilling tool within the conductive work piece along a tool path to form a bore hole having a variable geometry that extends through the conductive work piece when the material is removed therefrom, the drilling tool including a plurality of electrode patches;
   direct an inspection device to conduct an inspection of the conductive work piece to determine a position of the drilling tool along the tool path; and
   determine a position error of the drilling tool, the position error defined by a difference between the position of the drilling tool when compared to a theoretical position of the drilling tool along a nominal tool path.

17. The one or more non-transitory computer-readable storage media in accordance with claim 16, wherein the computer-executable instructions further cause the controller to:
   direct the inspection device to conduct a pre-drilling inspection of the conductive work piece;
   determine variations in dimensions of the conductive work piece when compared to dimensions of a virtual conductive work piece; and
   modify the nominal tool path based on the variations in the conductive work piece.

18. The one or more non-transitory computer-readable storage media in accordance with claim 17, wherein the computer-executable instructions further cause the controller to execute a low-level corrective action when the position error is greater than the first predetermined threshold, and less than a second predetermined threshold greater than the first predetermined threshold.

19. The one or more non-transitory computer-readable storage media in accordance with claim 18, wherein the computer-executable instructions further cause the controller to execute a mid-level corrective action when the position error is greater than the second predetermined threshold, and less than a third predetermined threshold greater than the second predetermined threshold.

20. The one or more non-transitory computer-readable storage media in accordance with claim 19, wherein the computer-executable instructions further cause the controller to terminate operation of the drilling tool when the position error is greater than a fourth predetermined threshold greater than the third predetermined threshold.

* * * * *